United States Patent [19]
Aoyama

[11] Patent Number: 5,590,258
[45] Date of Patent: Dec. 31, 1996

[54] TEXT GENERATION APPARATUS

[75] Inventor: Shoichi Aoyama, Katano, Japan

[73] Assignee: Matsushita Electric Industrial Co., Ltd., Osaka, Japan

[21] Appl. No.: 316,942

[22] Filed: Oct. 3, 1994

[30] Foreign Application Priority Data

Oct. 1, 1993 [JP] Japan .................................. 5-247146

[51] Int. Cl.⁶ ...................................................... G06F 15/00
[52] U.S. Cl. ............................................ 395/793; 395/803
[58] Field of Search ..................................... 395/145, 146, 395/147, 148, 149, 144; 345/115, 116, 141

[56] References Cited

U.S. PATENT DOCUMENTS 5,220,649  6/1993  Forcier ................................. 395/148
5,467,448  11/1995  Hilton et al. ......................... 395/148

Primary Examiner—Phu K. Nguyen
Attorney, Agent, or Firm—Price, Gess & Ubell

[57] ABSTRACT

A text generation apparatus which generates a text including character rows which are separated by blank characters. These character rows are stored in a text storage unit and displayed by a display unit. The text generation unit includes a conversion position specification unit which specifies a conversion position in the text and a conversion mode determination unit which automatically determines insertion mode or replacement mode, according to whether the conversion position is a character or a blank character. The stored text can then be converted by inserting a character row inputted from an input unit or by replacing an existing character row with a character row inputted from an input unit in the specified position in the text, according to the appropriate conversion mode.

16 Claims, 14 Drawing Sheets

FIGURE 3

When special situation plays menu is called, such as kickoffs and extra points, a window with the appropriate play category will automatically appear.

| BYTE POSITION | ..... | 103 | 104 | 105 | 106 | 107 | 108 | 109 | 110 | 111 | 112 | 113 | 114 | 115 | ..... |
|---|---|---|---|---|---|---|---|---|---|---|---|---|---|---|---|
| CHARACTER CODE | ..... | t | h | e | ▨ | a | p | p | r | o | p | r | i | a | ..... |

FIGURE 5

| BYTE POSITION | ..... | 103 | 104 | 105 | 106 | 107 | 108 | 109 | 110 | 111 | 112 | 113 | 114 | 115 | ..... |
|---|---|---|---|---|---|---|---|---|---|---|---|---|---|---|---|
| CHARACTER CODE | ..... | t | h | e | ▨ | m | o | s | t | | a | p | p | r | ..... |

FIGURE 6

When special situation plays menu is called, such as kickoffs and extra points, a window with the most appropria te play category will automatically appear.

71 — When special situation plays menu is called, such as kickoffs and extra points, a window with the appropriate play category will automatically appear.

FIGURE 8

| BYTE POSITION | ... | 61 | 62 | 63 | 64 | 65 | 66 | 67 | 68 | 69 | 70 | 71 | 72 | ... |
|---|---|---|---|---|---|---|---|---|---|---|---|---|---|---|
| CHARACTER CODE | ... | k | i | c | k | o | f | f | s |  | a | n | d | ... |

FIGURE 9

| BYTE POSITION | ... | 61 | 62 | 63 | 64 | 65 | 66 | 67 | 68 | 69 | 70 | 71 | 72 | 73 | ... |
|---|---|---|---|---|---|---|---|---|---|---|---|---|---|---|---|
| CHARACTER CODE | ... | f | i | e | l | d |  | g | o | a | l | s |  | a | ... |

FIGURE 10

When special situation plays menu is called, such as field goals and extra points, a window with the appropriate play category will automatically appear.

FIGURE 11

| BYTE POSITION | ...... | 103 | 104 | 105 | 106 | 107 | 108 | 109 | 110 | 111 | 112 | 113 | 114 | 115 | ...... |
|---|---|---|---|---|---|---|---|---|---|---|---|---|---|---|---|
| CHARACTER CODE | ...... | t | h | e | ▨ | m | o | s | t | | | | | | ...... |

FIGURE 12

When special situation plays menu is called, such as kickoffs and extra points, a window with the most appropriate play category will automatically appear.

TEXT GENERATION APPARATUS

BACKGROUND OF THE INVENTION

1. Field of the Invention

The present invention relates to a text generation unit used by word processors of languages with blank characters between words.

2. Description of the Related Art

In recent years, the number of opportunities for generating text have been increasing along with the spread of work stations and word processors which use them. Also, opportunities for generating text whilst translating between different languages have also been on the increase. The following is an explanation of an apparatus used for such text generation.

FIG. 1 shows a construction of a text generation unit constructed according to the prior art. This text generation apparatus is comprised of an input operation unit 11 composed of a keyboard, an input determination unit 12, a text buffer insertion unit 13, a dictionary retrieval unit 14, a text buffer 15, a display unit 16 composed of a CRT or a printer etc., and a dictionary database 17.

The following is an explanation of the insertion operation of a character row by means of this text generation apparatus. First of all, the user makes use of the input operation unit 11 and specifies with the cursor the display position into which the character row is to be inserted. Having received this information, the input operation unit 11 informs the text buffer insertion unit 13, via the input determination means 12, of the specified display position. The user then depresses the activate dictionary key, and, having received notice of this from the input operation unit 11, the input determination unit 12 activates the dictionary retrieval unit 14. The user then inputs the character row (word) to be translated using the input operation unit 11, with the dictionary retrieval unit 14 retrieving the dictionary database 17, extracting one or more potential translations for the word, and having this displayed by the display unit 16. The user then uses the input operation unit 11 to give a selection indication for one of the several potential translations displayed by the display unit 16. The input operation unit 11 then informs the dictionary retrieval unit 14, via the input determination unit 12, of the selected translated character row. The dictionary retrieval unit 14 then notifies the text buffer insertion unit 13 of the selected translated character row. The text buffer insertion unit 13 inserts the translated character row into the byte position in the text buffer 15 corresponding to the specified display position, and has the inserted result shown by the display unit 16.

The text generation apparatus mentioned above is equipped with a dictionary retrieval function, but when no such function is present, the same kind of character row can be inserted by using independent dictionary software and a cut and paste function for character rows. Such a system is described in the following software manual published by A. I. Technology Inc., "rSTONE. JE V1.0 User's Guide" Page 4-1.

It is possible with the above text generation apparatus to insert the translated character rows into the text, but it is unable to replace an original character row in the text buffer 15 with a translated character row (that is to say, the original character row still remains). In order to replace the original character row, the user has to go to the trouble of giving a delete instruction for the original character, once the translated character row has been inserted.

Additionally, when the specified starting position described above marks a position within the original character row, then this will cause the inconvenient result of the inserted translated character row splitting the original character row.

SUMMARY OF THE INVENTION

The first object of the present invention is to provide a text generation unit which allows for the easy replacement of existing character or symbol rows stored in the text buffer with inputted character or symbol rows.

The second object of the present invention is to provide a text generation unit which allows for the easy conversion of a translated character or symbol row which is stored in the text buffer when there is an input of a character row to be translated.

The first object stated above is fulfilled by a text generation apparatus for generating a text including character rows separated by blank characters and displaying the text using a display unit, comprising: a text storage unit for storing information for character rows composed of at least 1 character which are displayed as being interposed with blank characters; a display unit for displaying the information stored in the text storage unit; a first input operation unit for receiving an input of character rows and symbols to be displayed and storing the character rows and symbols in the text storage unit; a conversion position specifying unit for receiving a specification of a conversion position, the specification converting the information stored in the text storage unit; a second input operation unit for receiving an input of a changing character row; a conversion mode determination unit for determining an appropriate conversion mode using an appropriate process for the conversion position received by the conversion position specifying unit; and a text content conversion unit for writing the changing character row received by the second input operation unit into the stored information in the text storage unit in accordance with the conversion mode determined by the conversion mode determination unit.

The conversion position specifying unit may include a position specification reception unit for receiving the specification of one of a character and a blank character displayed by the display unit and a marking unit for marking the position in the text storage unit which corresponds to one of the specified character and the specified blank character.

The mode determination unit may include an insertion mode determination unit for determining insertion mode when the marked character in the text storage unit is a blank character, a replacement mode determination unit for determining replacement mode when the marked character in the text storage unit is a character, and a conversion mode notification unit for notifying the text content conversion means one of insertion mode determined by the insertion mode determination unit and replacement mode determined by the replacement mode determination unit.

The second input operation unit may include a block specification unit for inputting existing character rows stored in the text storage unit specifying a block of text displayed by the display unit, a keyboard unit for inputting character rows by means of an operation of a keyboard, and a character row notification unit for notifying the text content conversion unit of the character rows inputted via the keyboard unit and the block specification unit.

The text content conversion unit may include a character row reception unit for receiving the character rows sent from the character row notification unit, a character row insertion unit for inserting a character row received by the character row reception unit into an appropriate position in the text storage unit, having received a notification of insertion mode from the conversion mode notification unit, and a character row replacement unit for substituting a character row received by the character row reception unit into the appropriate position in the text storage unit, having received a notification of replacement mode from the conversion mode notification unit.

The text content conversion unit may further include a character number calculation unit for calculating a number of characters in the character row received by the character row reception unit and a first text repositioning unit for moving forward the character rows coming immediately after a marked position by a number of characters given by adding 1 to the character number calculated by the character number calculation unit, having received a notification of insertion mode from the character row insertion unit.

The text content conversion unit may further include a replaced character number calculation unit for calculating a number of characters in the character row in the text storage unit to which the marked character belongs, a character difference number calculation unit for finding a character difference number by subtracting the character number calculated by the replaced character number calculation unit from the character number calculated by the character number calculation unit, and a second text repositioning unit, once a notification of replacement mode has been received by the character row conversion unit, for moving forward the character rows after and including the character row with the marked character in the text storage unit by the character difference number when the character difference number calculated by the character difference number calculation unit is positive, for erasing a number of characters equal to the character difference number starting at a front of the character row to which the marked character belongs and moving back the character rows including and following the marked character row by the character difference number when the character difference number is negative, and for leaving the existing character rows as they are when the character difference number is 0.

The second object stated above is fulfilled by a text generation apparatus for generating a text including character rows separated by blank characters and displaying the text using a display unit, comprising: a text storage unit for storing information for character rows composed of at least 1 character which are displayed as being interposed with blank characters; a first display unit for displaying the information stored in the text storage unit; a first input operation unit for receiving an input of character rows and symbols to be displayed and storing the character rows and symbols in the text storage unit; a conversion position specifying unit for receiving a specification of a conversion position, the specification converting the information stored in the text storage unit; a second input operation unit for receiving an input of a character row to be translated; a translated word dictionary storage unit for storing at least 1 potential translation corresponding to a character row to be translated; a retrieval unit for referring to the translated word dictionary storage unit and retrieving at least 1 potential translation corresponding to the character row to be translated inputted into the second input operation unit; a second display unit for displaying the potential translations retrieved by the retrieval unit; a potential translation selection operation unit for receiving a selection of one translated character row when there are a number of potential translations displayed by the second display unit, and for taking a potential translation as a translated character row when there is just one potential translation; a conversion mode determination unit for determining an appropriate conversion mode using an appropriate process for the conversion position received by the conversion position specifying unit; and a text content conversion unit for writing the translated character row selected by means of the potential translation selection operation unit into the stored information in the text storage unit in accordance with the conversion mode determined by the conversion mode determination unit.

The conversion position specifying unit may include a position specification reception unit for receiving the specification of one of a character and a blank character displayed by the display unit and a marking unit for marking the position in the text storage unit which corresponds to one of the specified character and the specified blank character.

The mode determination unit may include an insertion mode determination unit for determining insertion mode when the marked character in the text storage unit is a blank character, a replacement mode determination unit for determining replacement mode when the marked character in the text storage unit is a character, and a conversion mode notification unit for notifying the text content conversion means one of insertion mode determined by the insertion mode determination unit and replacement mode determined by the replacement mode determination unit.

The second input operation unit may include a keyboard unit for inputting a character row to be translated by means of an operation of a keyboard, and a character row to be translated notification unit for notifying the retrieval unit of the character row to be translated as inputted into the keyboard unit.

The retrieval unit may include a character row to be translated reception unit for receiving the character row to be translated as notified by the character row to be translated notification unit, a dictionary reference retrieval unit for retrieving at least 1 potential translation stored in the translated word dictionary storage unit corresponding to the character row to be translated received by the character row to be translated reception unit, and a potential translation notification unit for notifying the second display unit of the potential translations retrieved by the dictionary reference retrieval unit.

The potential translation selection operation unit may include a translated character row selection operation unit for receiving a selection of one out of the potential translations and a translated character row notification unit for notifying the text content conversion unit of the translated character row selected by the translated character row selection operation unit.

The text content conversion unit may include a translated character row reception unit for receiving the translated character row from the translated character row notification unit, a translated character row insertion unit for inserting the translated character row received from the translated character row reception unit into an appropriate position in the text storage unit, when a notification of insertion mode is received from the conversion mode notification unit, and a translated character row replacement unit for substituting in the translated character row received from the translated character row reception unit into an appropriate position in the text storage unit, when a notification of replacement mode is received from the conversion mode notification unit.

The text content conversion unit may further include a translated character number calculation unit for calculating a number of characters in the translated character row received by the translated character row reception unit, and a first text repositioning unit for moving forward the character rows coming immediately after the marked position by a number of characters given by adding 1 to the character number calculated by the translated character number calculation unit, having received a notification of insertion mode from the character row insertion unit.

The text content conversion unit may further include a replaced character number calculation unit for calculating a number of characters in the character row in the text storage unit to which the marked character belongs, a character difference number calculation unit for finding a character difference number by subtracting the character number calculated by the replaced character number calculation unit from the translated character number calculated by the translated character number calculation unit, and a second text repositioning unit, once a notification of replacement mode has been received by the translated character row replacement unit, for moving forward the character rows after and including the character row with the marked character in the text storage unit by the character difference number when the character difference number calculated by the character difference number calculation unit is positive, for erasing a number of characters equal to the character difference number starting at a front of the character row to which the marked character belongs and moving back the character rows including and following the marked character row by the character difference number when the character difference number is negative, and for leaving the existing character rows as they are when the character difference number is 0.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is a drawing showing an example of a display shown by the display unit in the above embodiment;

FIG. 4 is a table showing an example of the content in the text buffer before the character row insertion process has been executed in the above embodiment;

FIG. 5 is a table showing an example of the content of the text buffer after the character row insertion process has been executed in the above embodiment;

FIG. 6 is a drawing showing an example of a display shown by the display unit just after the insertion process has been executed in the above embodiment;

FIG. 7 is a drawing showing an example of a display shown by the display unit before the replacement of a character row in the above embodiment;

FIG. 8 is a table showing an example of the content of the text buffer before the replacement process has been executed in the above embodiment;

FIG. 9 is a table showing an example of the content of the text buffer after the replacement process has been executed in the above embodiment;

FIG. 10 is a drawing showing an example of a display shown by the display unit after the replacement of a character row in the above embodiment;

FIG. 11 is a table showing an example of the content in the text buffer after the new line process has been executed in the above embodiment;

FIG. 12 is a drawing showing an example of a display shown by the display unit after the new line process has been executed in the above embodiment;

DESCRIPTION OF THE PREFERRED EMBODIMENT

The following is an explanation of an embodiment of the present invention, a text generation apparatus.

Figure 1:
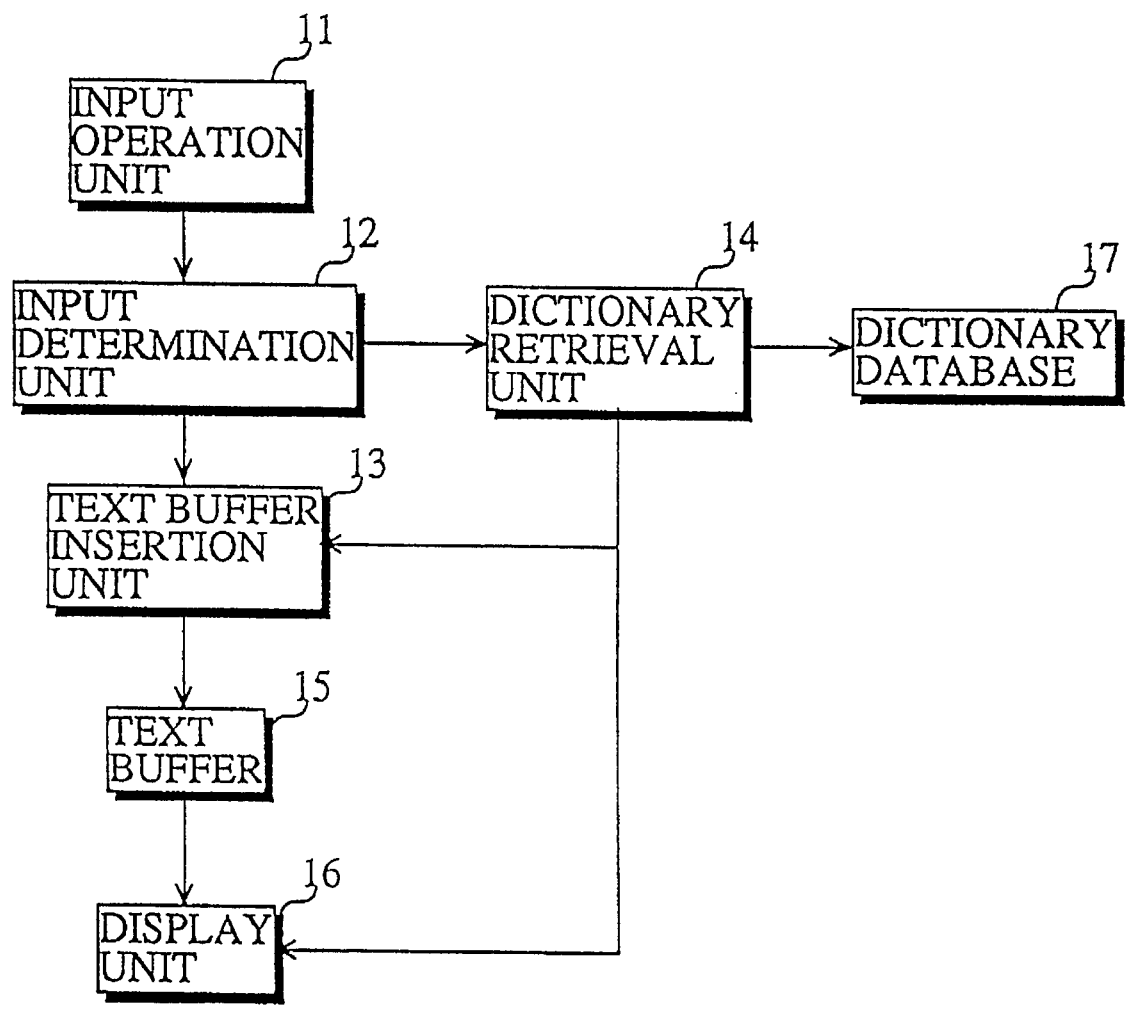
FIG. 1 is a construction of an example of a text generation apparatus with an electronic dictionary retrieval function in accordance with the prior art.
Figure 2:
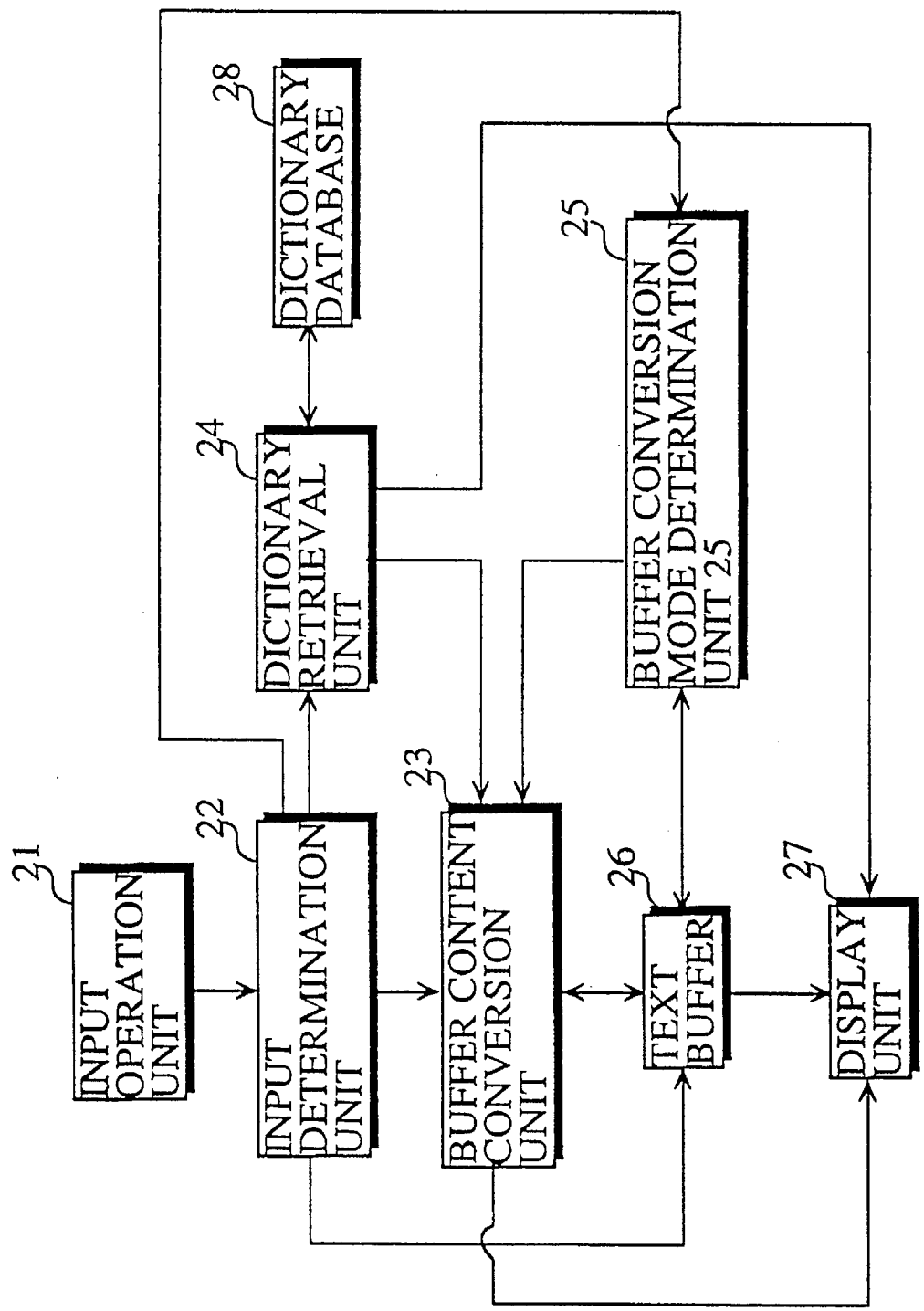
FIG. 2 is a construction of a text generation apparatus in accordance with the embodiment of the present invention.

FIG. 2 is a construction of a text generation apparatus in accordance with the embodiment of the present invention. This text generation apparatus is comprised of an input operation unit 21, an input determination unit 22, a buffer content conversion unit 23, a dictionary retrieval unit 24, a buffer conversion mode determination unit 25, a text buffer 26, a display unit 27, and a dictionary database 28.

The input operation unit 21 consists of a pointing device such as a keyboard or a mouse, and receives the user's input operations. That is to say, when the user depresses the character or sign keys, it receives the character row to be inserted or replaced (including sign rows), or the character row (words) to be translated, or when the designated key is depressed, receives the copy or move process request, or the dictionary retrieval process request, or when the mouse cursor is moved, it receives the indication of the insertion/ replacement position for the character row to be inserted or replaced. It also receives the normal character row input and editing processes which are executed when generating a document. The input operation unit 21 additionally receives the potential translation selection indication. Finally, having received the user's input operation, the input operation unit 21 then informs the input determination unit 22 of the content of the operation.

FIG. 3 shows an example of a character row of an English sentence inputted via the input operation unit 21 and displayed in the normal state by the display unit 27.

When the operation message received from the input operation unit 21 is for the document generation of a normal character row (including signs), the input determination unit 22 takes the inputted character row as it is and writes it into the text buffer 26. When the input operation is for the normal editing process, then it notifies the editing unit (not shown in the drawing). Additionally, when the mouse cursor is positioned on top of an existing character or blank character, then every time the cursor is moved the input determination unit 22 marks the corresponding character or blank character in the text buffer 26, and activates the buffer conversion mode determination unit 25. For example, when the mouse cursor 31 is positioned between [the ] and [appropriate], as shown in FIG. 3, then the character code corresponding to byte position [106] in the text buffer 26 will be marked with oblique shading, as is shown in FIG. 4. When the input of the dictionary retrieval activation input is received, it activates the dictionary retrieval unit 24, and notifies the dictionary retrieval unit 24 of the inputted character row to be translated. Also, when a copy or move input is received, then it informs the buffer content conversion unit 23 of the inputted character row or designated block of text.

Finally, when the operation message received from the input operation unit 21 is a selection indication of a potential translation, the input determination unit 22 informs the dictionary retrieval unit 24 of the selected potential translation.

The buffer content conversion unit 23 temporarily stores the character rows received from the input determination unit 22 or the translated character rows received from the dictionary retrieval unit 24, and calculates the number of characters in the character row or translated character row. Then, when the notification from the buffer conversion mode determination unit 25 described below is for insertion mode, then it moves the existing character rows starting from the byte position in the text buffer 26 corresponding to the marked blank character forward by a number of character spaces given by adding [1] to the above calculated number of characters in the character/translated character row, and then writes in the received character/translated character row, starting at the byte position immediately following the marked blank character (substituting), converting the stored content of the text buffer 26.

For example, when the mouse cursor 31 is positioned over the blank character which lies between [the] and [appropriate], as shown in FIG. 3, the character code corresponding to the byte position 106 is marked, as is shown in FIG. 4, and by interpreting this, the buffer conversion mode determination unit 25 determines that the mode is insertion mode. When the translated character row [most] is received from the dictionary retrieval unit 24 by the buffer content conversion unit 23, then the content of the text buffer 26 is changed as shown in FIG. 5, and is displayed by the display unit 27, as shown in FIG. 6.

On the other hand, when the notification from the buffer conversion mode determination unit 25 is for replacement mode, then it calculates the number of characters in the character row (word) to which the marked character in the text buffer 26 belongs. This calculated number of characters is set as the replaced character number, and the aforementioned number of characters in the character/translated character row is set as the replacement character number, with the replaced character number being subtracted from the replacement character number to find the character difference number. It then determines whether the character difference number is [0], [a positive number] or [a negative number].

If the character difference number is determined to be [0], then the aforementioned character/translated character row is written over the character row to which the marked character belongs in the text buffer 26, hence changing the stored content of the text buffer 26.

If the character difference number is determined to be [a positive number], then the character rows including and following the character row to which the marked character belongs are all moved forward by the number of characters corresponding to the character difference number, and the aforementioned character/translated character row is written in over the marked character row starting from the first byte position in the marked character row, hence changing the stored content of the text buffer 26.

For example, when an English sentence is displayed by the display unit 27, as shown in FIG. 7, and the mouse cursor 71 is positioned over the letter [o] in the character row [kickoffs], then the character [o] corresponding to the byte position [65] in the text buffer 26 is marked, as shown in FIG. 8.

The buffer content conversion unit 23 receives the notification for replacement mode from the buffer mode conversion determination unit 25, and, having received the translated character row [field goal] from the dictionary retrieval unit 24, and received the conversion instruction from the editing unit (not shown in the drawing) to change it to [field goals], calculates the character difference number, obtaining the result [3]. Subsequently [kickoffs] and all of the following character rows are moved so as start from byte position [64], given by adding [3] to byte position [61], and [field goals] is then substituted in starting from the original byte position [61], as shown in FIG. 9. The display subsequently shown by the display unit 27 is shown in FIG. 10.

If the character difference number is determined to be [a negative number], then, starting from the beginning of the marked character row, the same number of characters as the character difference number are erased, and the remaining part of the original character row and character rows which follow it are all moved forward to the starting position of the original marked character row, with the aforementioned character/translated character row being written in over the marked character row, starting from the first byte position in the marked character row after it has been moved, hence changing the stored content of the text buffer 26.

Additionally, the buffer content conversion unit 23 determines whether there are consecutive blank characters following after the converted character row on the same line. When it determines that there are, then it replaces the consecutive blank characters with just one blank character. When it determines that there are not, or once it has replaced consecutive blank characters with one blank character, then it calculates the total number of blank characters and characters on that line, and, comparing this to the specified number of characters on one line, determines whether a character row carries on into a second line. If one does carry on into a second line, then it writes the offending character row into the text buffer 26 so that it is positioned at the start of the second line, and replaces all of the remaining characters in the first line with blank characters.

For example, when [most] is inserted between [the] and [appropriate], as shown in FIG. 6, and the specified number of characters in one line is 30, then the final [t] and [e] characters in the character row [appropriate] cannot fit into that row and are forced onto the next. Subsequently, the buffer content conversion unit 23 moves the character row [appropriate] to the next line, and replaces the characters following [most] with blank characters, as shown in FIG. 11. The display for the example English sentence of FIG. 6 which is displayed by the display unit 27 once this process is complete is shown in FIG. 12.

Once activated by the input determination unit 22, the dictionary retrieval unit 24 retrieves at least one potential translation from the dictionary database 28 (explained later) corresponding to the character row to be translated which it receives from the input determination unit 22, and has the potential translations displayed by the display unit 27. Having received notification from the input determination unit 22 as to which potential translation has been selected, it then notifies the buffer content conversion unit 23 that this potential translation is to be used as the translated character row.

Having been activated by the input determination unit 22, the buffer conversion mode determination unit 25 looks at the position of the mark in the text buffer 26, determining the mode as being replacement mode when the mark is positioned over a character, or as being insertion mode when the mark is positioned over a blank character. It then informs the buffer content conversion unit 23 as to which of the two modes is operational.

The text buffer 26 is constructed of RAM or suchlike and stores the existing character rows which are written into it by the input determination unit 22. The character code position which corresponds to the position of the mouse cursor on the screen of the display unit 27 is marked by the input determination unit 22.

The stored content of the text buffer 26 is also changed by the buffer content conversion unit 23.

FIGS. 4, 5, 8, 9 and 11 all show typical examples of the stored content of the text buffer 26.

The display unit 27 is comprised of a CRT or a liquid crystal panel, and is made to display the stored content of the text buffer 26 by the buffer content conversion unit 23 or the potential translations by the dictionary retrieval unit 24.

FIGS. 3, 6, 7, 10 and 12 depict displays of different stored contents of the text buffer 26.

Figure 13:
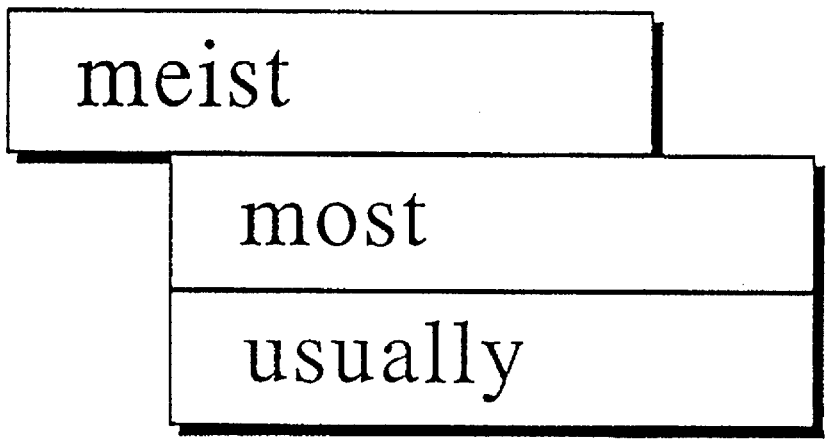
FIG. 13 is a table showing an example of the character row to be translated and the potential translations which are displayed by the display unit in the above embodiment.

FIG. 13 shows that the potential translations [most] and [usually] are displayed by the display unit 27 when the German word [meist] to be translated is inputted via the input operation unit 21.

Figure 14:
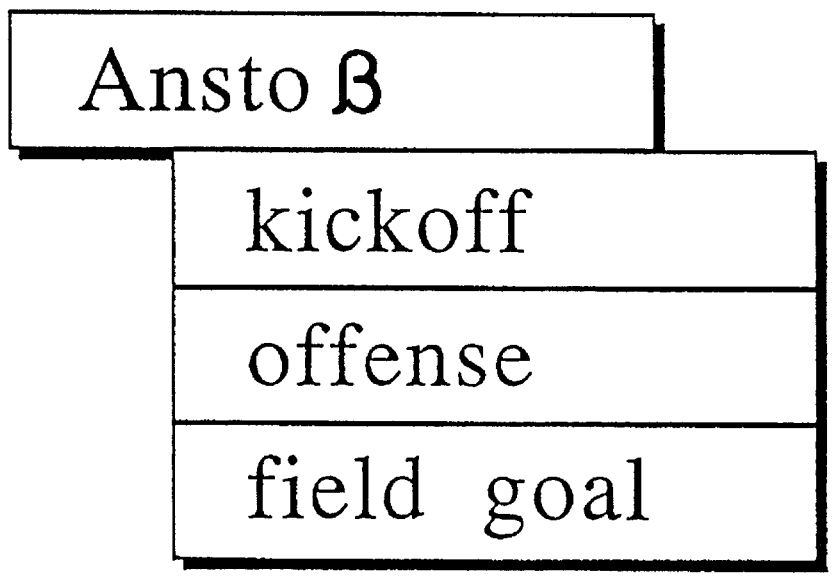
FIG. 14 is also a table showing an example of the character row to be translated and the potential translations which are displayed by the display unit in the above embodiment.

In the same way, FIG. 14 shows that the potential translations [kickoff], [offense] and [field goal] are displayed by the display unit 27 when the German word [Anstoβ] to be translated is inputted via the input operation unit 21.

The dictionary database 28 is constructed of a storage medium, such as CD-ROM, and stores at least one potential translation word which corresponds to the word to be translated. FIGS. 13 and 14 each show an example of the content of the dictionary database 28.

Figure 15:
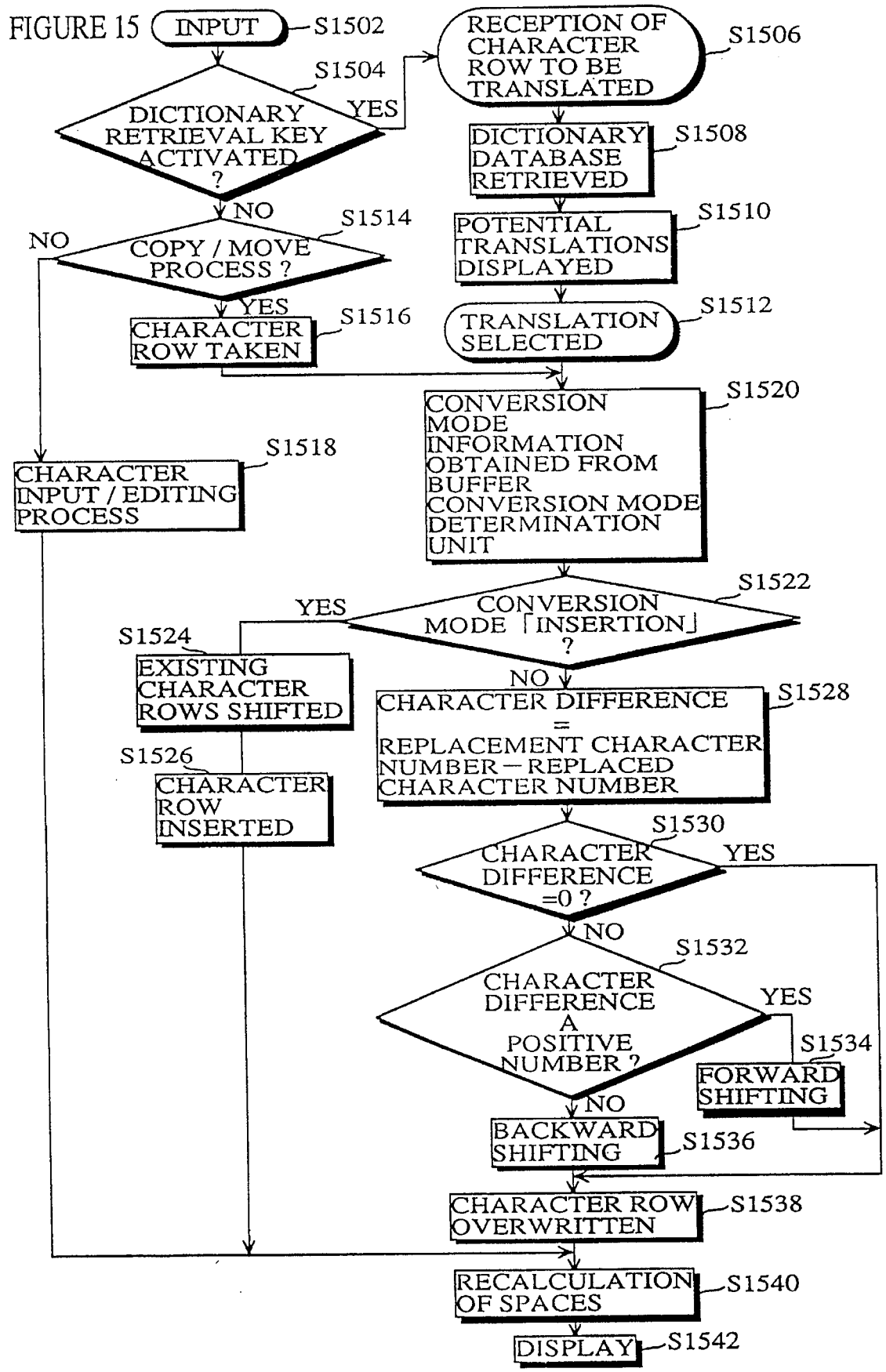
FIG. 15 is a flowchart which shows the operation of the above embodiment.
Figure 16:
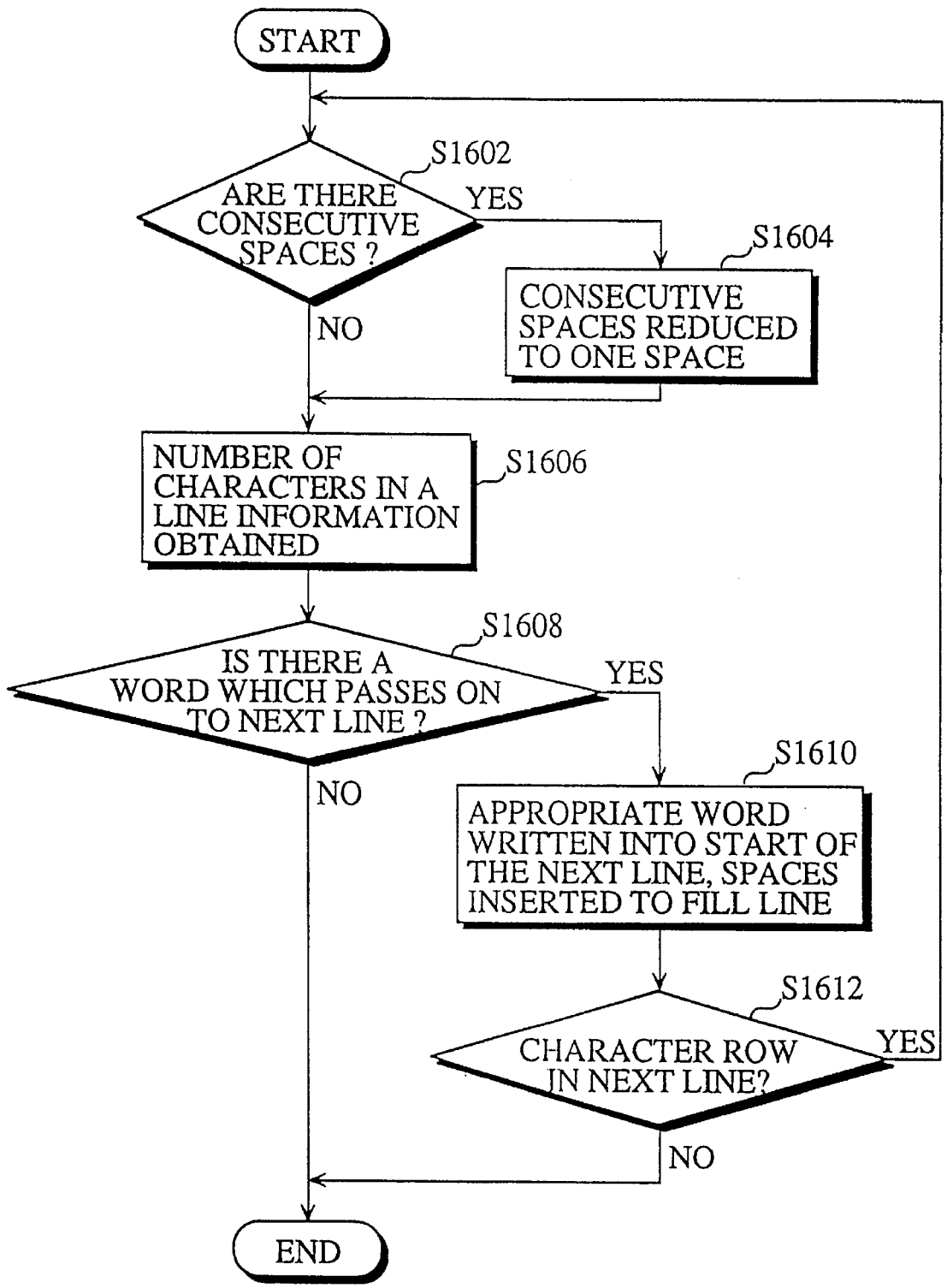
FIG. 16 is a flowchart which shows the blank character recalculation operation in the above embodiment.

The following is an explanation of the operation of the present embodiment using the flowcharts depicted in FIGS. 15 and 16.

When there is an input from the input operation unit 21 (S1502), the input determination unit 22 determines whether that input was from the dictionary retrieval key or not (S1504). When it is an input from the dictionary retrieval key, the input determination unit 22 activates the dictionary retrieval unit 24, and the input operation unit 21 receives the character row (word) to be translated (S1506).

Having received the notification of the character row to be translated from the input operation unit 21, the dictionary retrieval unit 24 retrieves the dictionary database 28 (S1508). It then has the potential translations displayed by the display unit 27 (S1510), and the user's selection inputted via the input operation unit 21 (S1512), before notifying the buffer content conversion unit 23 of the selected translated character row.

When the input determination unit 22 determines in S1504 that the input is not from the dictionary retrieval key, it then determines whether it is for a copy or move process (S1514). When it determines that the input is for a copy or move process, then it receives the notification of the specified block or character row from the input operation unit 21, and then taking in this character row notifies the buffer content conversion unit 23 (S1516), before moving on to S1520. When it determines that the input is not for a copy or move process, then the input determination unit 22 has the inputted character row stored as a normally entered character input in the text buffer 26 by means of the editing unit (not illustrated) (S1518).

Next, the buffer content conversion unit 23 obtains the conversion mode information specifying either insertion mode or replacement mode from the buffer conversion mode determination unit 25 (S1520). That is to say, the buffer conversion mode determination unit 25 determines insertion mode when the mouse cursor is positioned over a blank character, or determines replacement mode when the mouse cursor is positioned over a character.

When the input is for a copy or move process, the buffer content conversion unit 23 determines whether the conversion mode is insertion mode (S1522), if so, moving the existing character rows forward by a number of characters found by adding 1 to the number of characters in the character row obtained in S1516 or in the translated character row obtained in S1512 (S1524), inserting the character row or translated character row (S1526), and moving on to S1540.

When it is determined in S1522 that the conversion mode is not insertion mode, and hence replacement mode, then the buffer content conversion unit 23 works out the character difference number between the replaced character row and the replacement character row (S1528). It then determines whether the character difference number is 0 (S1530), and when it is 0, leaves the replaced character row in its position and writes the replacement character row over it (S1538). Since both the replacement and the replaced character rows are of the same length, it does not change the character rows which follow in the text.

When it determines that the character difference number is not 0, then it determines whether the character difference number is a positive number (S1532), and when it is a positive number, since the replacement character row is longer than the replaced character row, then it moves forward all of the existing character rows beginning with the replaced character row by the number of character spaces corresponding to the character difference number (S1534), and substitutes in the replacement character row (S1538).

When it determines in S1532 that the character difference number is not a positive number, meaning that the replacement character row is shorter than the replaced character row, then it deletes the number of characters corresponding to the character difference number from the start of the replaced character row, and moves the existing character rows backward by the number of character spaces equating to the character difference number (S1536), before substituting in the replacement character row (S1538).

The buffer content conversion unit 23 then recalculates the number of blank characters (S1540), and has the stored content of the text buffer 26 displayed by the display unit 27 (S1542).

Since the existing character rows stored in the text buffer 26 are moved by the insertion or replacement of character rows, the blank character recalculation, shown in detail in FIG. 16, is executed so as to adjust the blank characters.

The buffer content conversion unit 23 determines whether there are consecutive blank characters in the converted line stored in the text buffer 26 (S1602), replacing consecutive blank characters with just one blank character (S1604) when it finds that there are consecutive blank characters. Then it calculates the number of characters in the line, obtaining the number of characters in a line information (S1606) which, when larger in comparison with the designated number of characters in one line, shows that adjustment using blank characters is necessary. It then determines whether there is a word which carries over into a second line (S1608), if so, changing the content of the text buffer 26 so that the word is repositioned so as to start at the beginning of the second line and that the remainder of the first line is filled with blank characters (S1610).

It then determines whether, aside from this word positioned at the start, any existing character rows are present in this second line (S1612), returning to S1602 when there are, and completing the blank character recalculation when there are not.

The above is an explanation of one embodiment of the present invention, but it should be evident that the present invention is not limited to the embodiment which is described above. That is to say, the following example features may also be used.

In the above embodiment, a German-English dictionary database is used as the dictionary database 28 but, by changing this to an English-German dictionary, the text generation unit may be used to create German language text.

Additionally, by using a Japanese-English database, it may insert the word [most] as in the above embodiment, when the Japanese character row [mottomo] is input.

The above embodiment features an electronic dictionary reference function comprised of a dictionary retrieval unit 24 and a dictionary base 28, but it also possible for the present invention not to include such a dictionary retrieval unit 24 and a dictionary base 28.

Also in the above embodiment, the insertion or replacement position of the character row to be inserted or replaced is specified by using a mouse cursor, but it is also possible for this specifying to be executed by means of the cursor keys located on the keyboard.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

What is claimed is:

1. A text generation apparatus for generating a text including character rows separated by blank characters and displaying the text using display means, comprising:

text storage means for storing information for character rows composed of at least one (1) character which are displayed as being interposed with blank characters;

display means for displaying the information stored in the text storage means;

first input operation means for receiving an input of character rows and symbols to be displayed and storing the character rows and symbols in the text storage means;

conversion position specifying means for receiving a specification of a conversion position, the specification converting the information stored in the text storage means;

second input operation means for receiving an input of a changing character row;

conversion mode determination means for determining an appropriate conversion mode using an appropriate process for the conversion position received by the conversion position specifying means; and text content conversion means for writing the changing character row received by the second input operation means into the stored information in the text storage means in accordance with the conversion mode determined by the conversion mode determination means.

2. The text generation apparatus of claim 1, wherein:

said conversion position specifying means includes, a position specification reception unit for receiving the specification of one of a character and a blank character displayed by the display means; and a marking unit for marking the position in the text storage means which corresponds to one of the specified character and the specified blank character.

3. The text generation apparatus of claim 2, wherein:

said mode determination means includes;

an insertion mode determination unit for determining insertion mode when the marked character in the text storage means is a blank character;

a replacement mode determination unit for determining replacement mode when the marked character in the text storage means is a character; and a conversion mode notification unit for notifying the text content conversion means one of insertion mode determined by the insertion mode determination unit and replacement mode determined by the replacement mode determination unit.

4. The text generation apparatus of claim 3, wherein:

said second input operation means includes;

a block specification unit for inputting existing character rows stored in the text storage means specifying a block of text displayed by the display means;

a keyboard unit for inputting character rows by means of an operation of a keyboard; and a character row notification unit for notifying the text content conversion means of the character rows inputted via the keyboard unit and the block specification unit.

5. The text generation apparatus of claim 4, wherein:

said text content conversion means includes;

a character row reception unit for receiving the character rows sent from the character row notification unit;

a character row insertion unit for inserting a character row received by the character row reception unit into an appropriate position in the text storage means, having received a notification of insertion mode from the conversion mode notification unit; and a character row replacement unit for substituting a character row received by the character row reception unit into the appropriate position in the text storage means, having received a notification of replacement mode from the conversion mode notification unit.

6. The text generation apparatus of claim 5, wherein:

said text content conversion means further includes;

a character number calculation unit for calculating a number of characters in the character row received by the character row reception unit; and a first text repositioning unit for moving forward the character rows coming immediately after a marked position by a number of characters given by adding 1 to the character number calculated by the character number calculation unit, having received a notification of insertion mode from the character row insertion unit.

7. The text generation apparatus of claim 6, wherein:

said text content conversion means further includes;

a replaced character number calculation unit for calculating a number of characters in the character row in the text storage means to which the marked character belongs;

a character difference number calculation unit for finding a character difference number by subtracting the character number calculated by the replaced character number calculation unit from the character number calculated by the character number calculation unit; and a second text repositioning unit, once a notification of replacement mode has been received by the character row conversion unit, for moving forward the character rows after and including the character row with the marked character in the text storage means by the character difference number when the character difference number calculated by the character difference number calculation unit is positive, for erasing a number of characters equal to the character difference number starting at a front of the character row to which the marked character belongs and moving back the character rows including and following the marked character row by the character difference number when the character difference number is negative, and for leaving the existing character rows as they are when the character difference number is 0.

8. A text generation apparatus for generating a text including character rows separated by blank characters and displaying the text using display means, comprising:

text storage means for storing information for character rows composed of at least 1 character which are displayed as being interposed with blank characters;

first display means for displaying the information stored in the text storage means;

first input operation means for receiving an input of character rows and symbols to be displayed and storing the character rows and symbols in the text storage means;

conversion position specifying means for receiving a specification of a conversion position, the specification converting the information stored in the text storage means;

second input operation means for receiving an input of a character row to be translated;

translated word dictionary storage means for storing at least one (1) potential translation corresponding to a character row to be translated;

retrieval means for referring to the translated word dictionary storage means and retrieving at least 1 potential translation corresponding to the character row to be translated inputted into the second input operation means;

second display means for displaying the potential translations retrieved by the retrieval means;

potential translation selection operation means for receiving a selection of one translated character row when there are a number of potential translations displayed by the second display means, and for taking a potential translation as a translated character row when there is just one potential translation;

conversion mode determination means for determining an appropriate conversion mode using an appropriate process for the conversion position received by the conversion position specifying means; and text content conversion means for writing the translated character row selected by means of the potential translation selection operation means into the stored information in the text storage means in accordance with the conversion mode determined by the conversion mode determination means.

9. The text generation apparatus of claim 8, wherein:

said conversion position specifying means includes, a position specification reception unit for receiving the specification of one of a character and a blank character displayed by the display means; and a marking unit for marking the position in the text storage means which corresponds to one of the specified character and the specified blank character.

10. The text generation apparatus of claim 9, wherein:

said mode determination means includes;

an insertion mode determination unit for determining insertion mode when the marked character in the text storage means is a blank character;

a replacement mode determination unit for determining replacement mode when the marked character in the text storage means is a character; and a conversion mode notification unit for notifying the text content conversion means one of insertion mode determined by the insertion mode determination unit and replacement mode determined by the replacement mode determination unit.

11. The text generation apparatus of claim 10, wherein:

said second input operation means includes;

a keyboard unit for inputting a character row to be translated by means of an operation of a keyboard; and a character row to be translated notification unit for notifying the retrieval means of the character row to be translated as inputted into the keyboard unit.

12. The text generation apparatus of claim 11, wherein:

said retrieval means includes;

a character row to be translated reception unit for receiving the character row to be translated as notified by the character row to be translated notification unit;

a dictionary reference retrieval unit for retrieving at least 1 potential translation stored in the translated word dictionary storage means corresponding to the character row to be translated received by the character row to be translated reception unit; and a potential translation notification unit for notifying the second display means of the potential translations retrieved by the dictionary reference retrieval unit.

13. The text generation apparatus of claim 12, wherein:

said potential translation selection operation means includes;

a translated character row selection operation unit for receiving a selection of one out of the potential translations; and a translated character row notification unit for notifying the text content conversion means of the translated character row selected by the translated character row selection operation unit.

14. The text generation apparatus of claim 13, wherein:

said text content conversion means includes;

a translated character row reception unit for receiving the translated character row from the translated character row notification unit;

a translated character row insertion unit for inserting the translated character row received from the translated character row reception unit into an appropriate position in the text storage means, when a notification of insertion mode is received from the conversion mode notification unit; and a translated character row replacement unit for substituting in the translated character row received from the translated character row reception unit into an appropriate position in the text storage means, when a notification of replacement mode is received from the conversion mode notification unit.

15. The text generation apparatus of claim 14, wherein:

said text content conversion means further includes;

a translated character number calculation unit for calculating a number of characters in the translated character row received by the translated character row reception unit; and a first text repositioning unit for moving forward the character rows coming immediately after the marked position by a number of characters given by adding 1 to the character number calculated by the translated character number calculation unit, having received a notification of insertion mode from the character row insertion unit.

16. The text generation apparatus of claim 15, wherein:

said text content conversion means further includes;

a replaced character number calculation unit for calculating a number of characters in the character row in the text storage means to which the marked character belongs;

a character difference number calculation unit for finding a character difference number by subtracting the character number calculated by the replaced character number calculation unit from the translated character number calculated by the translated character number calculation unit; and a second text repositioning unit, once a notification of replacement mode has been received by the translated character row replacement unit, for moving forward the character rows after and including the character row with the marked character in the text storage means by the character difference number when the character difference number calculated by the character difference number calculation unit is positive, for erasing a number of characters equal to the character difference number starting at a front of the character row to which the marked character belongs and moving back the character rows including and following the marked character row by the character difference number when the character difference number is negative, and for leaving the existing character rows as they are when the character difference number is 0.

\* \* \* \* \*